United States Patent
Ott et al.

(10) Patent No.: US 11,420,082 B2
(45) Date of Patent: Aug. 23, 2022

(54) PRESSURE RELEASE DEVICE

(71) Applicant: Eaton Intelligent Power Limited, Dublin (IE)

(72) Inventors: Toni Christian Ott, Neckargemund (DE); Reiner Naumann, Mannheim (DE); Dominik Herbold, Mauer (DE)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/314,638

(22) PCT Filed: Jun. 21, 2017

(86) PCT No.: PCT/EP2017/065283
§ 371 (c)(1),
(2) Date: Dec. 31, 2018

(87) PCT Pub. No.: WO2018/001832
PCT Pub. Date: Jan. 4, 2018

(65) Prior Publication Data
US 2019/0321667 A1    Oct. 24, 2019

(30) Foreign Application Priority Data

Jun. 29, 2016 (DE) .......................... 102016211763.7

(51) Int. Cl.
*A62C 3/16* (2006.01)
*A62C 4/00* (2006.01)
(Continued)

(52) U.S. Cl.
CPC .................. *A62C 3/16* (2013.01); *A62C 4/00* (2013.01); *G01L 19/0663* (2013.01); *H02G 3/0412* (2013.01)

(58) Field of Classification Search
CPC .......... A62C 4/00; A62C 3/16; G01L 19/0663
See application file for complete search history.

(56) References Cited

U.S. PATENT DOCUMENTS 2,400,719 A * 5/1946 Stackhouse ............ B01D 46/10
   55/527
2,781,941 A * 2/1957 Lindsay .................. F23L 17/02
   220/327
(Continued)

FOREIGN PATENT DOCUMENTS

DE    102006048242 A1    4/2008
DE    102010016782 A1    11/2011
(Continued)

OTHER PUBLICATIONS

International Search Report for PCT/EP2017/065283, dated Sep. 28, 2017, 6 pages.

*Primary Examiner* — Reinaldo Sanchez-Medina
*Assistant Examiner* — Nicole Gardner
(74) *Attorney, Agent, or Firm* — Stinson LLP

(57) ABSTRACT

The invention relates to a pressure relief device (1) for a housing (2) which is protected against explosions, in particular is compression-proof and has a wall connecting piece (3) which can be at least partially inserted into a housing opening (4) of a housing wall (6) by its insertion connecting piece section (5), which can be in particular detachably fixed from an inner side of the housing and rests from the outside on an opening edge (8) of the housing opening (4) in its inserted and fixed position with a radially outwardly projecting support flange (7), wherein the insertion connecting piece section (5) furthermore comprises a projecting connecting piece section (9) which is opposite the insertion connecting piece section relative to the support flange (7) and comprises a longitudinal conduit (10) running through the wall connecting piece (3) into which conduit a flame-blocking body (11) is replaceable inserted, wherein a pressure nut (13) which loads the flame blocking body (11) with pressure in its insertion position and with a pressure edge (14) projecting radially inward at least in sections can be screwed onto a free end section (12) of the projecting connecting piece section (9), and wherein the pressure edge (14) contacts an outer viewing side of the flame blocking body (11).

29 Claims, 4 Drawing Sheets

(51) Int. Cl.
*G01L 19/06* (2006.01)
*H02G 3/04* (2006.01)

(56) References Cited

U.S. PATENT DOCUMENTS

| | | | | |
|---|---|---|---|---|
| 3,507,708 A * | 4/1970 | Vignaud | ............ | H01M 2/1264 |
| | | | | 429/86 |
| 5,891,223 A * | 4/1999 | Shaw | .................... | B01D 46/10 |
| | | | | 96/134 |
| 6,524,361 B1 * | 2/2003 | Thornton | ........... | B01D 19/0031 |
| | | | | 55/385.1 |
| 7,066,337 B2 * | 6/2006 | Hsu | .................... | B01D 46/0002 |
| | | | | 210/452 |
| 7,156,890 B1 * | 1/2007 | Thompson | ......... | B01D 46/0005 |
| | | | | 301/108.1 |
| 9,492,694 B2 * | 11/2016 | Mann | ........................ | A62C 3/16 |
| 2004/0177696 A1 | 9/2004 | Pepperling et al. | | |
| 2013/0206759 A1 * | 8/2013 | Wurz | ...................... | A62C 3/00 |
| | | | | 220/88.2 |

FOREIGN PATENT DOCUMENTS

| | | |
|---|---|---|
| EP | 2842609 A2 | 3/2015 |
| JP | H11153504 A | 8/1999 |

* cited by examiner

US 11,420,082 B2

PRESSURE RELEASE DEVICE

CROSS-REFERENCE TO RELATED APPLICATION

This application is a 371 of international of PCT Serial No. PCT/EP2017/065283, filed Jun. 21, 2017, which claims the benefit of German Serial No. 102016211763.7, filed Jun. 29, 2016, the entire contents of which are incorporated herein by reference.

The invention relates to a pressure relief device for a housing which is protected against explosions, in particular is compression-proof and has a wall connecting piece which can be at least partially inserted into a housing opening of a housing wall by its insertion connecting piece section, can be in particular detachably fixed from an inner side of the housing and rests from the outside on an opening edge of the housing opening in its inserted and fixed position with a radially outwardly projection support flange, wherein the wall connecting piece furthermore comprises a projecting connecting piece section which is opposite the insertion connecting piece section relative to the support flange and comprises a longitudinal conduit running through the wall connecting piece into which conduit a flame-blocking body is replaceably inserted.

Such a pressure relief device is known, for example, from DE 10 2013 109 260 A1. Electrical or electronic structural parts and components are present in the corresponding housing. If an ignitable atmosphere is present outside of the housing, the latter can serve as ignition sources. If an explosion takes place outside of the housing, it should be prevented that flames or ignition sparks exit from the housing and possibly ignite the corresponding, outer atmosphere. To this end, the corresponding flame blocking body is inserted into the longitudinal conduit of the pressure-relief device. The latter is fastened, according to DE 10 2013 190 260 A1, in a firmly bonded and/or non-positive and/or positive manner in the longitudinal conduit so that an arrangement of the flame blocking body which has no ignition gap but allows gas to pass through is possible.

The invention is based on the problem of improving the pressure release device of the initially cited type in such a manner that the function of the flame blocking body can be readily checked visually from the outside and the flame blocking body can be optionally readily replaced. Furthermore, the flame blocking body should be simple to insert and can optionally be variably loaded with pressure.

This problem is solved by the features of Claim 1.

According to the invention the pressure-relief device is distinguished in particular in that a pressure nut which loads the flame blocking body with pressure in its insertion position and comprises a pressure edge projecting radially inward at least in positions can be screwed on to a free end section of the projecting connection piece section. The pressure edge then makes contact with an outer viewing side of the flame blocking body. The pressure loading takes place by an appropriate fastening of the pressure nut, wherein the exertion of pressure takes place via the pressure edge which makes contact with the outer viewing side of the flame blocking body. The flame blocking body can be replaced by simply loosening the pressure nut. At the same time, the corresponding pressure edge extends only so far radially inward that the greatest part of the outer viewing side of the flame blocking body can be visually seen from the outside.

The pressure relief device according to the invention can also be used instead of other known pressure release devices. There is also the possibility in this connection that the corresponding flame blocking body is composed of several individual flame blocking bodies in order to be able to use, for example, separate materials for each of the flame blocking bodies.

In order to be able to reproduce the arrangement of the flame blocking body inside the longitudinal conduit in a simple manner, the longitudinal conduit can comprise a radially inwardly projecting support step for fixing the insertion position of the flame blocking body. That is, the flame blocking body is simply inserted into the longitudinal conduit and pressed against the support step. The further fixing and loading with pressure then take place by screwing the pressure nut on.

In order to be able to optionally arrange flame blocking bodies with different thicknesses, a spacer ring can be arranged between the support step and the blocking body. Moreover, the arrangement of the corresponding spacer ring can differ in certain device groups. For example, in the device group II B a thinner flame blocking body is used than in the device group II C. The thinner flame blocking body makes possible a higher pressure relief, as a result of which another pressure relief may not be necessary in order to lower an interior pressure in the corresponding housing to an admissible level. As a result of the simple and secure arrangement of the corresponding flame blocking body, a use of the pressure relief device according to the invention is also possible at rather low temperatures. It should be noted here that the explosion pressure increases when the temperature drops.

A simple fastening of the pressure nut can take place if the projecting support section comprises an outer thread fitting the inner thread of the pressure nut. This outer thread extends at least partially along the projecting support section and with a length sufficient to make possible a sufficient pressure loading of the flame blocking body in particular over the pressure edge. It is possible here that the pressure edge also projects, for example, inside the area of a longitudinal bore of the nut and is pressed onto the upper side or outer viewing side of the flame blocking body during the screwing on of the pressure nut.

An improved visibility of the flame blocking body can result, however, in an advantageous manner if the pressure edge is formed on the outer free end of the pressure nut.

Furthermore, the pressure nut can be screwed on by, for example, an appropriate tool if the pressure edge is designed in particular on its outside as a screw-in square and preferably as a screw-in hexagon. There is the possibility that the pressure edge is designed with a flat bottom which correspondingly presses on the outer viewing side of the flame blocking body. In order to achieve an improved exertion of pressure, the pressure edge can comprise a pressing projection on its lower side facing the flame blocking body. This projection is constructed, for example, on the free end of the radially inwardly projecting pressure edge. The projection can be designed to be flat or also convexly curved in the direction of the flame blocking body. This pressing projection brings about, before a complete screwing on of the pressure nut, a corresponding pressing of the flame blocking body on the pressing projection.

A random loosening of the pressure nut should be prevented in housings which are protected against explosion in a corresponding manner since otherwise the flame blocking body possibly no longer fulfills its function. To this end, there is the possibility of designing the pressure nut, for example, as a nut secure against being rotated. Another possibility is that in order for the securing, a tight-fitting screw can be laterally screwed into the pressure nut.

The flame body can be produced from different materials and in different manners. In a preferred embodiment the flame blocking body can be a sintered body. This advantageously consists of inflammable metal fibers, ceramic foams or also mixtures of appropriate, inflammable materials. In such a sintered body the porosity, pore size, density and other qualities of the produced flame blocking body can be selected as required. Other granular or powdery substances can also be used to produce such a sintered body.

The flame blocking body comprises a flat top and/or bottom with a flat edge area between them. It is also conceivable that a certain curvature is present at least in an edge area or also on the entire upper side and lower side. The edge area is as a rule flat since the complete ignition safety is realized mainly there. The spacer ring should also be sufficiently protected in case of fire or flames so that it is advantageously produced from a flame-protected or fireproof material.

In order in particular to insert the insertion connecting piece section in a simple manner into the appropriate housing opening and to then be able to bring the support flange in contact with the corresponding edge of the housing opening, the insertion connecting piece can comprise a thread relief groove on its end section bordering the support flange. A corresponding thread is formed in the remaining area which is used from the inside of the housing to position a counter nut or the like. Moreover, there is the possibility that an appropriate sealing element is provided between the edge of the housing opening and the support flange in order to meet the corresponding requirements of explosion protection even in this area.

As already mentioned above, the flame blocking body should be inserted without an ignition gap into the longitudinal conduit. This can take place in particular in that given the appropriate pressure loading by the pressure nut, the flame blocking body is slightly deformed in order to avoid the occurrence of corresponding ignition gaps between a circumferential edge of the flame blocking body and the longitudinal conduit.

In order to be able to optionally arrange several flame blocking bodies in the appropriate longitudinal conduit, an intermediate connecting piece can be arranged between the pressure nut and the support surface, which piece can be screwed by its connection piece end section onto the projecting connection piece section and on whose other nut end section the pressure nut can be screwed on. Another support step or annular step can be appropriately arranged in this intermediate connecting piece on which step another flame blocking body can be arranged.

In order to load an already present flame blocking body in the projecting connection piece section with the intermediate connecting piece, the intermediate connecting piece can comprise a radially inwardly projecting pressure step which loads the flame body with pressure in the direction of the support step. If the intermediate connecting piece is screwed on in a corresponding manner, then the pressure step presses the flame blocking body in the direction of the support step as was already described above in conjunction with the pressure nut.

The corresponding pressure step can be formed at different positions of the intermediate connecting piece, wherein in a simple exemplary embodiment the pressure step can be arranged on a lower end of the end section of the nut.

In order to be able to arrange a flame blocking body or the like in an appropriate manner in the intermediate connecting piece in analogy with the wall connecting piece, the nut end section can comprise a radially inwardly projecting annular step whose outside diameter is in particular substantially equal to an outside diameter of the support step. The same flame blocking bodies or the like can be arranged by these outside diameters which are substantially the same. However, it can also be advantageous if, instead of another flame blocking body, a body for protection against sprayed water can be arranged on the annular step and can be loaded by pressure with the pressure nut by the pressure edge in the direction of the annular step. Such a body for protection against sprayed water serves for protection against sprayed water so that it cannot penetrate into the pressure relief device.

The corresponding body for protection against sprayed water is arranged downstream from the flame blocking body in the direction of the corresponding housing opening.

The body for protection against sprayed water can also be a sintered body. The body for protection against sprayed water and the flame blocking body can be produced from the same material. This applies to a sintered body but also to other bodies for realizing a body for protection against sprayed water or a flame blocking body.

The body for protection against sprayed water can have a greater density than the flame blocking body. As a result of the greater density, this body for protection against sprayed water has a lower porosity which prevents a corresponding penetration of sprayed water.

In order to be able to remove any moisture which forms in the longitudinal conduit or which penetrated into it, the body for protection against sprayed water can comprise at least one drainage opening. This opening can preferably be designed as an edge groove which is open to the outside in a radial direction. However, even bores in the body for protection against sprayed water are also conceivable which connect the two sides of the body for protection against sprayed water in the longitudinal direction of the longitudinal conduit.

The body for protection against sprayed water and the flame blocking body are preferably arranged at a distance from one another in the longitudinal conduit. The appropriate distance is determined by the arrangement of the support step relative to the annular step. Moisture can possibly collect in this intermediate space which can then be discharged to the outside via the drainage openings.

In order to protect the flame blocking body from moisture and optionally from dust or the like, a moisture protection membrane can be arranged in particular in a replaceable manner between the body for protection against sprayed water and the flame blocking body. This prevents that moisture reaches the flame blocking body, wherein this also serves to prevent dust or the like. Dust or other contaminating particles might possibly clog the flame blocking body and its porosity for the passage of gas. As a rule, the membrane is designed in such a manner that it is destroyed upon an appropriate excess pressure from sides of the housing in front of the flame protection body so that corresponding gases can exit outward in an unimpeded manner via the pressure relief device. The membrane can be readily replaced afterwards. This also applies to the body for protection against sprayed water, which can receive dust and other contaminating particles and can then be replaced before a corresponding clogging.

According to the invention, all parts such as the flame blocking body, the body for protection against sprayed water, and the moisture protection membrane can be separately replaced. All of them can be readily checked visually from the outside at the same time.

Just like the pressure nut, the intermediate connecting piece can also be secured with a tight-fit screw or the like in its screwed-on position.

This also applies to an auxiliary means for screwing the intermediate connecting piece, wherein the latter can have, for example, a radially outwardly projecting screw-in square in the form of a screw-in hexagon.

It can furthermore be advantageous in particular in conjunction with the exerting of pressure by the pressure nut or the intermediate connecting piece on the body for protection against sprayed water and/or the flame blocking body if the body for protection against sprayed water and/or the flame blocking body area optionally elastic under pressure. The body for protection against sprayed water and/or the flame blocking body can comprise a pore closure on the outer edge side in order to improve in particular the complete ignition safety in the area of the outer edge of both bodies without influencing the permeability of gas.

The invention is explained and described in detail in the following using the figures attached in the drawings.

Figure 1:
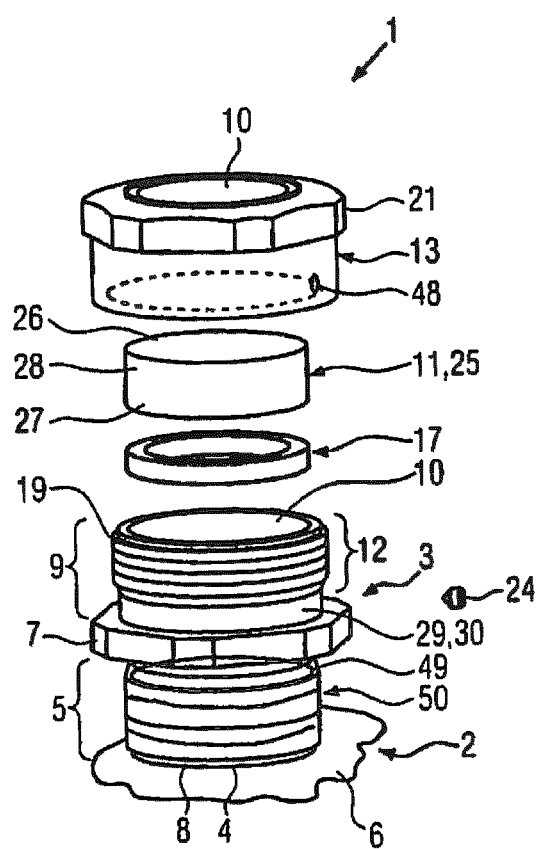
FIG. 1 shows an exploded view of an exemplary embodiment of a pressure relief device.

FIG. 1 shows an exploded view of a first exemplary embodiment of a pressure relief device 1 according to the invention. It is inserted into a housing opening 4 of the housing 2 which is not shown in more detail and comprises a wall connecting piece 3. The wall connecting piece 3 comprises an insertion connecting piece section 5 and a projecting connection piece section 9. The support flange 7 is arranged between these two. In the case in which the connecting piece section 5 is completely inserted in the housing opening 4, the support flange 7 rests along an opening edge 8 of the housing opening 4 from the outside on the corresponding housing wall 6. The insertion connecting piece 5 comprises an outer thread 50 onto which a corresponding counter nut can be screwed from the inside of the housing, or which can be screwed into an opening thread.

The corresponding pressure release device 1 serves to release the pressure if a certain explosion pressure builds up inside the housing. The corresponding housing 2 should be built to be explosion-proof and in particular pressure-proof. Upon an explosion in the housing the corresponding explosion pressure is relieved by the corresponding pressure relief device in that corresponding explosion gases exit to the outside via a flame blocking body of the pressure relief device. This flame blocking body is gas-permeable and secure against complete ignition. According to the invention the flame blocking body 11 is arranged inside a corresponding longitudinal conduit 10 of the pressure relief device 1, wherein this longitudinal conduit 10 extends through the wall connecting piece 3 as well as through a corresponding pressure nut 13.

The projecting connecting piece section 9 has a free end section 12 with outer thread 19 and has an end section 29 with thread 19 relief groove 30 between this outer thread 19 and the support flange 7.

The pressure nut 13 can be screwed onto the outer thread 19 by a corresponding inner thread 18.

The support flange 7 comprises a hexagon along its outer circumference in order to fix it by a tool in its position during the screwing on of the corresponding counter nut from the inside of the housing.

The insertion connecting piece section 5 has an undercut 49 above a corresponding outer thread 50, which undercut directly follows the support flange 7.

The flame blocking body 11 is preferably constructed as a sintered body 25. The latter can be produced from appropriate, inflammable materials such as ceramic foam, metallic fibers or the like. The flame blocking body has an appropriate porosity which makes possible the permeability of gas and at the same time ensures the complete ignition safety.

The flame blocking body 11 has an upper side 26 and a lower side 27 which are connected by an edge area 28. In the exemplary embodiment shown, the upper side 26 and the lower side 27 are designed to be flat, wherein, however, a curvature can be present in the entire range of the upper side or of the lower side or at least along the edge of the upper side and the lower side. Such a curvature can be either concave or convex. If the pressure nut 13 is screwed onto the projecting connecting piece section 9, it can be secured in its screwed-on position by, for example, a tight-fit screw 24. The screw is laterally screwed into the pressure nut into a corresponding thread bore 48, see also FIG. 2. Instead of only one flame blocking body 11, two or more flame blocking bodies can be arranged as well as, for example, also a spacer ring 17 in addition. The latter also consists of a fireproof material or at least of a fire-protected material which can be an appropriate plastic, a sintered material or the like.

Figure 2:
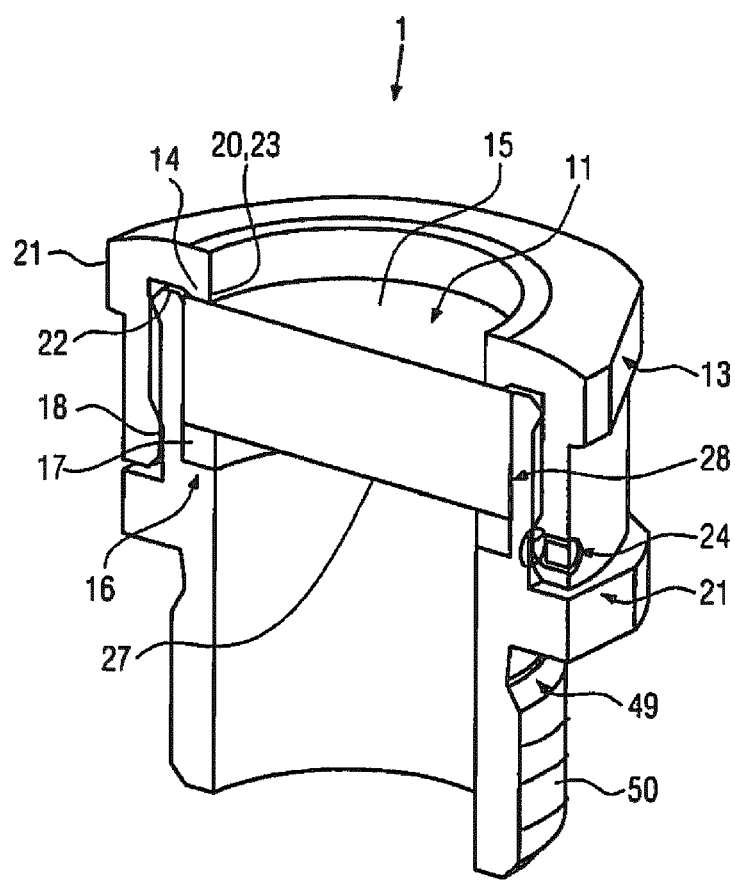
FIG. 2 shows an enlarged view of the combined pressure relief devices according to FIG. 1.

FIG. 2 shows the corresponding parts according to FIG. 1 in their assembled position. It can be recognized in the longitudinal section that the projecting connecting piece section 9 comprises a radially inwardly projecting support step 16 on its inner side. The flame blocking body 11 can be directly arranged on this step or optionally between it and the support step of the corresponding spacer ring 17. The flame blocking body 11 is clamped in between support step 16 or spacer ring 17 and pressure nut 13. The pressure nut 13 comprises a radially inwardly projecting pressure edge 14. This edge comprises on its inner, free end 20 a pressure projection 23 which projects downward from its lower side. This projection rests from above on a corresponding outer viewing surface 15 of the flame blocking body 11 and loads it with pressure in the direction of the support step 16 and the spacer ring 17. In FIG. 2 the pressure nut 13 is screwed by its inner thread 18 to the corresponding outer thread 19 of the projecting connecting piece section 9 until the projecting connecting piece section opposes an inner surface 22 of the pressure nut.

In this manner the flame blocking body 11 is loaded in such a manner that it is arranged in the longitudinal conduit 10 without an ignition gap and in a gas-permeable manner.

The pressure nut 13 comprises on the outer edge of the corresponding pressure edge 14 a corresponding screw-in square 21, in particular in the shape of a hexagon.

The edge area 28 has a close contact with an inner side of the longitudinal conduit 10 so that no ignition gap or other free spaces are formed between the latter.

Figure 3:
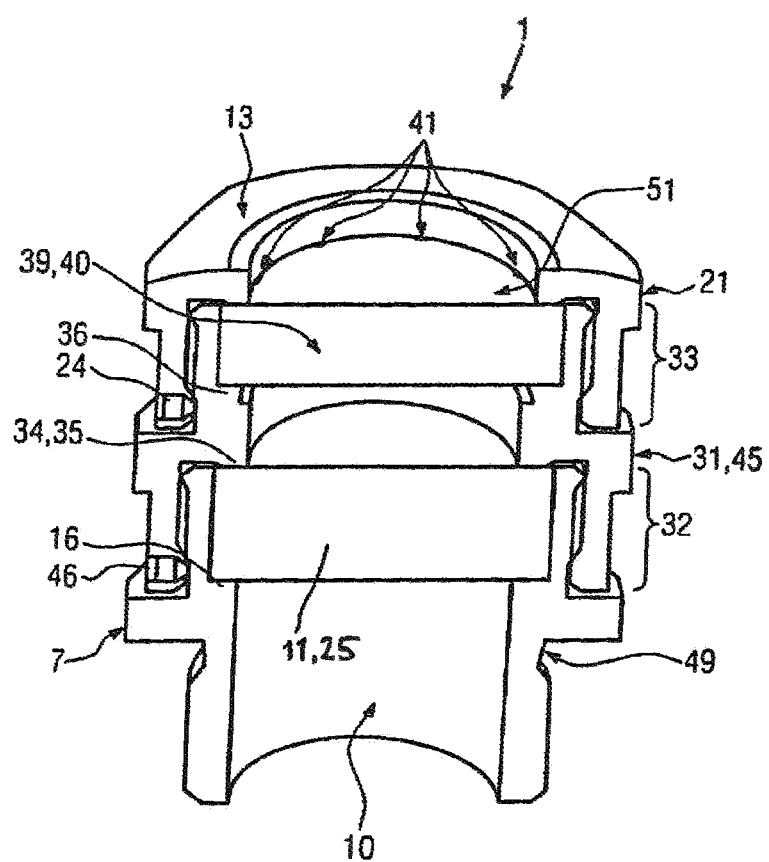
FIG. 3 shows a view analogous to FIG. 2 for a second exemplary embodiment of a pressure relief device with an intermediate connection piece.

FIG. 3 shows a second exemplary embodiment of a pressure relief device 1 analogous to FIG. 2. This pressure release device 1 differs from the pressure release device already described especially by an intermediate connecting piece 31. The latter serves as an intermediate component between wall connecting piece 3 and pressure nut 13. In analogy with FIG. 2, the corresponding flame blocking body 11 is placed in this case without additional support ring 17 on the support step 16. The corresponding pressure loading of the flame blocking body 11 in the direction of the support step 16 takes place by a radially inwardly projecting pressure step 34. The latter is formed on the lower end 35 of a nut end section 33 of the intermediate connecting piece 31. The intermediate connecting piece 31 furthermore comprises a connecting piece end section 32 which is screwed onto the corresponding outer thread 19 of the projecting connecting piece section 9 in analogy with the pressure nut 13 according to FIG. 2. A corresponding outer hexagon is formed between connecting piece and section 32 and nut end section 33.

Furthermore, a radially inwardly projecting annular step 36 is formed in the area of the nut end section 33. The latter comprises approximately the same outside diameter 37, see FIG. 4, as the support step 16 with its outside diameter 38.

The annular step 36 serves to arrange a body for protection against sprayed water 39. The latter can be produced from the same material as the flame blocking body. As a rule, the body for protection against sprayed water 39 is also a sintered body 40. A density of the body for protection against sprayed water 39 is less than a corresponding density of flame blocking body 11. As a consequence, for example, given the same material for both bodies the corresponding porosities differ in the case of a back body. That is, the body for protection against sprayed water has a lower porosity.

The body for protection against sprayed water 39 is held analogously to FIG. 2 by the corresponding pressure nut 13 and is loaded with pressure in the direction of annular step 36.

Furthermore, the intermediate connecting piece 31 can be secured in its screwed-on position 45 for example by a tight-fit screw 46, see FIG. 3, analogously to the pressure nut 13.

Drainage openings 41 are visible on a top side 51 of the body for protection against sprayed water 39 in the area of the pressure edge 14 of the pressure nut 13. These openings extend outward, see also FIG. 4, in particular in the shape of radially outwardly open edge grooves 42 between the inner chamber limited by the body for protection against sprayed water 39 and the flame blocking body 11. The drainage openings 41 serve as dehumidifying openings for any moisture present in the corresponding inner chamber. Furthermore, the body for protection against sprayed water 39 serves a protection against sprayed water and dust or other contaminating particles. The body for protection against sprayed water 39 prevents a penetration of the latter into the longitudinal conduit 10.

Figure 4:
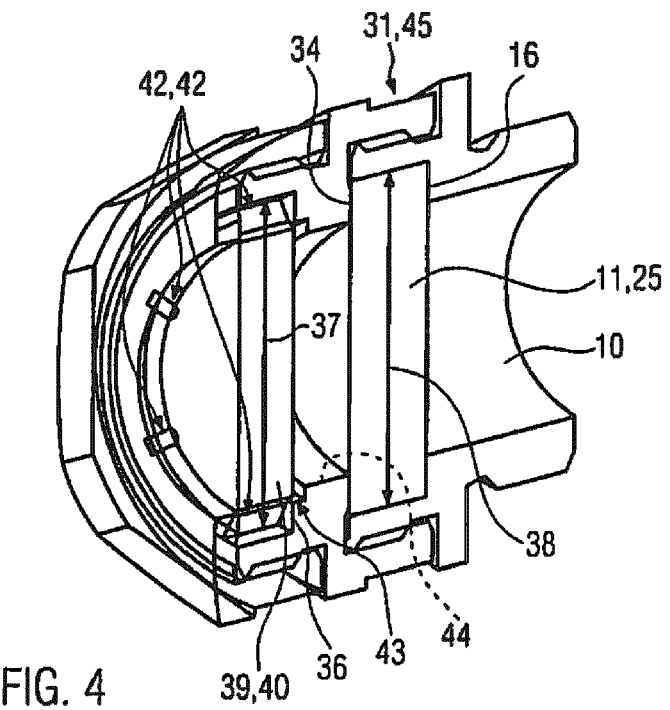
FIG. 4 shows a sectional view of the pressure release device according to FIG. 3.

An upper part of the pressure relief device 1 according to FIG. 3 is visible in FIG. 4 in another longitudinal section. In addition, in FIG. 4 a moisture protection membrane 44 is arranged in the intermediate space between the body for protection against sprayed water 39 and the flame blocking body 11 as an alternative for another exemplary embodiment. The moisture protection membrane 44 can also be directly arranged, for example, on a lower side of the body for protection against sprayed water 39 and/or on a top side of the flame blocking body 11. The moisture protection membrane 44 protects against a penetration of moisture in the direction of the flame blocking body. The tear resistance of the moisture protection membrane 44 is designed in such a manner that it already tears at a relatively low pressure at which a corresponding pressure reduction takes place by the pressure relief device 1. The moisture protection membrane 44 can be replaced just like the body for protection against sprayed water 39 and the flame blocking body 11.

Figure 5:
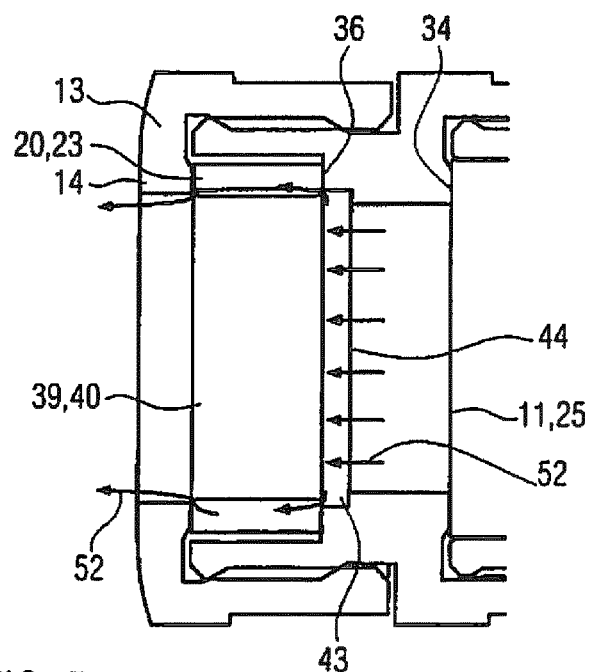
FIG. 5 shows an enlarged view in particular of a body for protection against sprayed water according to FIG. 4.

In particular, the drainage openings in the form of edge grooves 42 can be recognized in FIG. 4. These grooves communicate on sides of the flame blocking body 11 with a bunghole 43 in the area of the annular step 36 so that an escape of moisture can take place via bunghole 43 and drainage openings 41 to the outside relative to the pressure relief device 1. This is also shown in particular in FIG. 5 by the corresponding escape arrows 52.

Certain parts are not shown in the figures for the sake of simplification such as, for example, an additional sealing element which can be arranged between opening edge 8 and the bottom side of the support flange 7.

The body for protection against sprayed water 39 protects in particular the flame blocking body 11 from outside influences such as moisture and dust or other contaminants. If the body for protection against sprayed water 39 is negatively influenced, for example, by receiving corresponding dust in its porosity, it can be replaced by a new body for protection against sprayed water 39 by simply screwing off the pressure nut 13. At the same time, the invention ensures that the flame blocking body as well as the body for protection against sprayed water can be readily visually checked from the outside and replaced if necessary. The visual checking and replacement can take place independently from one another.

The assembled pressure relief device according to the invention can also be directly screwed, for example, into a corresponding screw-in opening of a housing, see in this regard the corresponding outer thread in the area of the insertion connecting piece 5. The connection here should be designed to be protected against explosion and in particular pressure-proof.

In order to improve the freedom of the ignition gap in the edge area in particular of the flame blocking body and optionally also in the area of the body for protection against sprayed water, the edge area can comprise an edge-side pore closure. Furthermore, the body for protection against sprayed water and/or the flame blocking body can be elastic under pressure.

According to the invention a pressure inside the housing resulting, for example, from an explosion is degraded by the pressure relief device. An explosive atmosphere which may be present outside of the housing is not ignited then since the pressure relief device is designed to be gas-permeable but secure against complete ignition. The pressure relief device according to the invention can also be retrofitted and used for housings which previously used other pressure relief devices. The pressure relief device according to the invention furthermore allows the use of appropriate housings or also of other containers at rather low temperatures. It should be noted here that the explosion pressure rises at rather low temperatures and can also be securely degraded in such an instance by the pressure relief device according to the invention.

Especially if the pressure relief device is used outside of buildings or in a moist environment and possibly in a dusty environment, it can additionally comprise the intermediate connecting piece and the body for protection against sprayed water. The latter protects the flame blocking body from water and dust. The body for protection against sprayed water comprises to this end drainage openings which remove penetrated moisture or seeped-in water to the outside. In comparison to the body for protection against sprayed water the flame blocking body has as a rule a lesser density so that it can more easily degrade even high pressures by the gas permeability and can at the same time better cool down the possibly hot gases. Both bodies can be readily visually checked and be replaced independently of one another.

A penetration of moisture in the direction of the flame blocking body can be improved by the additional arrangement of an appropriate moisture protection membrane and at the same time the pressure relief device can be protected regarding a possibly higher load.

The invention claimed is:

1. A pressure relief device for a housing comprising:
a wall connecting piece including an insertion connecting piece configured to be at least partially inserted into a housing opening of a housing wall of the housing and configured to be detachably fixed to the housing, the wall connecting piece including a support flange projecting radially outward from the insertion connecting piece and configured to rest on the outside of an opening edge of the housing opening when the insertion connecting piece is inserted and fixed to the housing, the wall connecting piece including a projecting connecting piece section opposite the insertion connecting piece section relative to the support flange, the projecting connecting piece section defining at least a portion of a longitudinal conduit running through the wall connecting piece, the longitudinal conduit including a radially inwardly projecting support step;
a flame-blocking body replaceably inserted into the longitudinal conduit;
an intermediate connecting piece having a longitudinal conduit running therethrough, the intermediate connecting piece including a connecting piece end section configured to be threadably connected to the projecting connecting piece section of the wall connecting piece and a nut end section, the nut end section including a radially inwardly projecting annular step and configured to be threadably connected to a pressure nut, wherein the intermediate connecting piece includes a pressure step which projects radially inward and loads the flame blocking body with pressure in a direction of the support step;
a sprayed water body for protection against sprayed water replaceably inserted into the longitudinal conduit of the intermediate connecting piece; and
a pressure nut configured to secure the sprayed water body in the longitudinal conduit in an insertion position, the pressure nut configured to be threadably connected to a free end section of the nut end, the pressure nut including a pressure edge projecting radially inward that loads the sprayed water body with pressure in a direction of the annular step, the pressure edge configured to contact an outer viewing side of the sprayed water body.

2. The pressure relief device according to claim 1, wherein the pressure relief device further comprises a spacer ring arranged between the support step and the flame blocking body, the spacer ring directly engaging an axially facing surface of the radially inwardly projecting support step.

3. The pressure relief device according to claim 2, wherein the spacer ring is formed by a flame-protected or fire-proof material.

4. The pressure relief device according to claim 1, wherein the projecting connecting piece section includes an outer thread which fits an inner thread of the pressure nut.

5. The pressure relief device according to claim 1, wherein the pressure edge has an outer side that is shaped as a screw-in polygon.

6. The pressure relief device according to claim 1, wherein the flame blocking body is a sintered body and has a flat upper side and a lower side with a flat edge area between the flat upper side and lower side, the flat upper side defining the outer viewing side.

7. The pressure relief device according to claim 1, wherein the insertion connecting piece section has a thread relief groove on an end section of the insertion connecting piece section bordering the support flange.

8. The pressure relief device according to claim 1, wherein the flame blocking body is inserted without an ignition gap into the longitudinal conduit.

9. The pressure relief device according to claim 1, further comprising a tight-fit screw that can be screwed laterally through a bore in the pressure nut and engage a longitudinally extending surface of the projecting connecting piece section to secure the pressure nut to the projecting connecting piece section.

10. A pressure relief device for a housing comprising:
a wall connecting piece including an insertion connecting piece configured to be at least partially inserted into a housing opening of a housing wall of the housing and configured to be detachably fixed to the housing, the wall connecting piece including a support flange projecting radially outward from the insertion connecting piece and configured to rest on the outside of an opening edge of the housing opening when the insertion connecting piece is inserted and fixed to the housing, the wall connecting piece including a projecting connecting piece section opposite the insertion connecting piece section relative to the support flange, the projecting connecting piece section defining at least a portion of a longitudinal conduit running through the wall connecting piece;
a flame-blocking body replaceably inserted into the longitudinal conduit;
a pressure nut including a pressure edge projecting radially inward;
an intermediate connecting piece configured to be arranged between the pressure nut and the wall connecting piece, the intermediate connecting piece including a connection piece end section configured to be threadably connected to the projecting connection piece section and a nut end section configured to be threadably connected to the pressure nut, wherein the intermediate connecting piece includes a pressure step which projects radially inward and loads the flame blocking body with pressure in the direction of the support step; and
a sprayed water body loaded with pressure by the pressure edge of the pressure nut, the pressure edge configured to contact an outer viewing side of the sprayed water body, wherein the sprayed water body for protection against sprayed water has a higher density than the flame blocking body.

11. The pressure relief device according to claim 10, wherein the pressure step is arranged on a lower end of the nut end section.

12. The pressure relief device according to claim 11, wherein the nut end section includes a radially inwardly projecting annular step having an outside diameter that is substantially equal to an outside diameter of the support step.

13. The pressure relief device according to claim 12, wherein the sprayed water body is arranged on the annular step and loaded with pressure by the pressure edge of the pressure nut in the direction of the annular step, wherein the sprayed water body for protection against sprayed water is a sintered body.

14. The pressure relief device according to claim 13, wherein the sprayed water body for protection against sprayed water and the flame blocking body are produced from the same material.

15. The pressure relief device according to claim 13, wherein the sprayed water body for protection against sprayed water and the flame blocking body are elastic under pressure and include a pore closure on an outer edge side.

16. The pressure relief device according to claim 10, wherein the sprayed water body for protection against sprayed water includes at least one drainage opening, wherein each drainage opening is a radially outwardly open edge groove.

17. The pressure relief device according to claim 16, wherein the annular step includes a bunghole connecting the longitudinal conduit and each drainage opening, wherein the sprayed water body for protection against sprayed water and the flame blocking body are arranged at a distance from one another in the longitudinal conduit.

18. The pressure relief device according to claim 17, further comprising a moisture protection membrane replaceably arranged between the sprayed water body for protection against sprayed water and the flame blocking body.

19. The pressure relief device according to claim 10, further comprising a tight-fit screw that can be screwed into the intermediate connecting piece to secure the intermediate connecting piece to the projecting connecting piece section, wherein the intermediate connecting piece includes a radially outwardly projecting screw-in polygon.

20. A pressure relief device for a housing comprising:
a wall connecting piece including an insertion connecting piece configured to be at least partially inserted into a housing opening of a housing wall of the housing and configured to be detachably fixed to the housing, the wall connecting piece including a support flange projecting radially outward from the insertion connecting piece and configured to rest on the outside of an opening edge of the housing opening when the insertion connecting piece is inserted and fixed to the housing, the wall connecting piece including a projecting connecting piece section opposite the insertion connecting piece section relative to the support flange, the projecting connecting piece section defining at least a portion of a longitudinal conduit running through the wall connecting piece;
a flame-blocking body replaceably inserted into the longitudinal conduit;
a pressure nut including a pressure edge projecting radially inward;
an intermediate connecting piece configured to be arranged between the pressure nut and the wall connecting piece, the intermediate connecting piece including a connection piece end section configured to be threadably connected to the projecting connection piece section and a nut end section configured to be threadably connected to the pressure nut, wherein the intermediate connecting piece includes a pressure step which projects radially inward and loads the flame blocking body with pressure in the direction of the support step; and
a sprayed water body loaded with pressure by the pressure edge of the pressure nut, the pressure edge configured to contact an outer viewing side of the sprayed water body, wherein the sprayed water body for protection against sprayed water and the flame blocking body are elastic under pressure and include a pore closure on an outer edge side.

21. A pressure relief device for a housing comprising:
a wall connecting piece including an insertion connecting piece configured to be at least partially inserted into a housing opening of a housing wall of the housing and configured to be detachably fixed to the housing, the wall connecting piece including a support flange projecting radially outward from the insertion connecting piece and configured to rest on the outside of an opening edge of the housing opening when the insertion connecting piece is inserted and fixed to the housing, the wall connecting piece including a projecting connecting piece section opposite the insertion connecting piece section relative to the support flange, the projecting connecting piece section defining at least a portion of a longitudinal conduit running through the wall connecting piece;
a flame-blocking body replaceably inserted into the longitudinal conduit;
a pressure nut including a pressure edge projecting radially inward;
an intermediate connecting piece configured to be arranged between the pressure nut and the wall connecting piece, the intermediate connecting piece including a connection piece end section configured to be threadably connected to the projecting connection piece section and a nut end section configured to be threadably connected to the pressure nut, wherein the intermediate connecting piece includes a pressure step which projects radially inward and loads the flame blocking body with pressure in the direction of the support step; and
a sprayed water body loaded with pressure by the pressure edge of the pressure nut, the pressure edge configured to contact an outer viewing side of the sprayed water body;
wherein the sprayed water body for protection against sprayed water includes at least one drainage opening, wherein each drainage opening is a radially outwardly open edge groove.

22. The pressure relief device according to claim 21, wherein the pressure step is arranged on a lower end of the nut end section.

23. The pressure relief device according to claim 22, wherein the nut end section includes a radially inwardly projecting annular step having an outside diameter that is substantially equal to an outside diameter of the support step.

24. The pressure relief device according to claim 23, wherein the sprayed water body is arranged on the annular step and loaded with pressure by the pressure edge of the pressure nut in the direction of the annular step, wherein the sprayed water body for protection against sprayed water is a sintered body.

25. The pressure relief device according to claim 24, wherein the sprayed water body for protection against sprayed water and the flame blocking body are produced from the same material.

26. The pressure relief device according to claim 24, wherein the sprayed water body for protection against sprayed water and the flame blocking body are elastic under pressure and include a pore closure on an outer edge side.

27. The pressure relief device according to claim 21, wherein the annular step includes a bunghole connecting the longitudinal conduit and each drainage opening, wherein the sprayed water body for protection against sprayed water and the flame blocking body are arranged at a distance from one another in the longitudinal conduit.

28. The pressure relief device according to claim 27, further comprising a moisture protection membrane replaceably arranged between the sprayed water body for protection against sprayed water and the flame blocking body.

29. The pressure relief device according to claim 21, further comprising a tight-fit screw that can be screwed into the intermediate connecting piece to secure the intermediate connecting piece to the projecting connecting piece section, wherein the intermediate connecting piece includes a radially outwardly projecting screw-in polygon.

* * * * *